(12) United States Patent
Yasue et al.

(10) Patent No.: US 8,250,344 B2
(45) Date of Patent: *Aug. 21, 2012

(54) METHODS AND APPARATUS FOR DYNAMIC PREDICTION BY SOFTWARE

(75) Inventors: Masahiro Yasue, Kanagawa (JP); Akiyuki Hatakeyama, Austin, TX (US)

(73) Assignee: Sony Computer Entertainment Inc. (JP)

( * ) Notice: Subject to any disclaimer, the term of this patent is extended or adjusted under 35 U.S.C. 154(b) by 13 days.

This patent is subject to a terminal disclaimer.

(21) Appl. No.: 12/540,522

(22) Filed: Aug. 13, 2009

(65) Prior Publication Data

US 2009/0313456 A1     Dec. 17, 2009

Related U.S. Application Data

(63) Continuation of application No. 11/344,403, filed on Jan. 31, 2006, now Pat. No. 7,627,740.

(60) Provisional application No. 60/650,157, filed on Feb. 4, 2005.

(51) Int. Cl.
*G06F 9/312* (2006.01)
(52) U.S. Cl. ...................................................... 712/207
(58) Field of Classification Search .................. None
See application file for complete search history.

(56) References Cited

U.S. PATENT DOCUMENTS

| | | | |
|---|---|---|---|
| 5,732,242 A | 3/1998 | Mowry | |
| 5,742,804 A | 4/1998 | Yeh et al. | |
| 5,949,995 A | 9/1999 | Freeman | |
| 6,092,188 A | 7/2000 | Corwin et al. | |
| 6,151,672 A * | 11/2000 | Hunt | 712/239 |
| 6,282,663 B1 | 8/2001 | Khazam | |
| 6,446,197 B1 * | 9/2002 | Krishnan et al. | 712/237 |
| 6,560,693 B1 | 5/2003 | Puzak et al. | |
| 7,234,040 B2 * | 6/2007 | Berg et al. | 711/213 |
| 7,240,159 B2 | 7/2007 | Hotta et al. | |
| 2002/0083312 A1 * | 6/2002 | Sinharoy | 712/240 |
| 2002/0095566 A1 | 7/2002 | Sharangpani et al. | |

* cited by examiner

*Primary Examiner* — Eric Coleman
(74) *Attorney, Agent, or Firm* — Lerner, David, Littenberg, Krumholz & Mentlik, LLP

(57) ABSTRACT

A method, storage medium, processor instruction and processor to for specifying a value in a first portion of a conditional pre-fetch instruction associated with a branch instruction used for effectuating a branch operation, specifying a target instruction address in a second portion of the instruction, evaluating the value to determine whether a condition is met, and pre-fetching one or more instructions starting at the target instruction address into an instruction buffer of the processor when the condition is met, is provided.

26 Claims, 3 Drawing Sheets

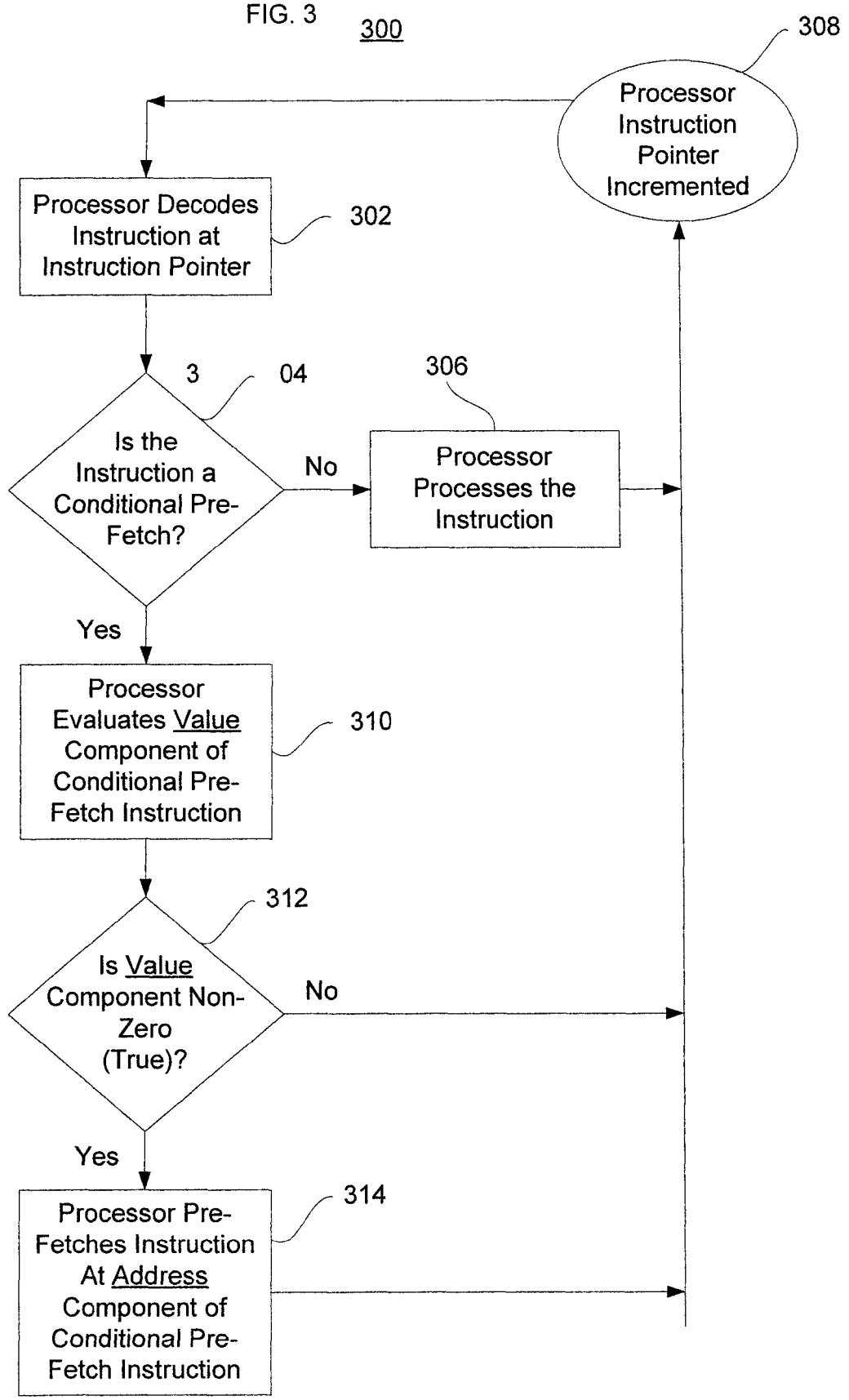

METHODS AND APPARATUS FOR DYNAMIC PREDICTION BY SOFTWARE

CROSS-REFERENCE TO RELATED APPLICATIONS

This application is a continuation of U.S. patent application Ser. No. 11/344,403, filed on Jan. 31, 2006, which claims the benefit of the filing date of U.S. Provisional Patent Application No. 60/650,157, filed Feb. 4, 2005, the entire disclosures of which are hereby incorporated herein by reference.

BACKGROUND OF THE INVENTION

The present invention relates generally to the field of computing systems, and methods for improving instruction execution, for example, in reducing branch instruction delays in pipelined processors.

Computer processors often use instruction buffers to speed up the execution of programs. Such a buffer, also referred to as an "instruction cache," allows the processor to queue the next several instructions in a pipeline while the processor is simultaneously executing another instruction. Thus, when the processor finishes executing an instruction the next instruction in the cache is available and ready for execution.

Many modern computing systems utilize a processor having a pipelined architecture to increase instruction throughput which use one or more instruction caches implemented by hardware or firmware.

Pipelining of instructions in an instruction cache may not be effective, however, when it comes to conditional jumps. When a conditional jump is encountered, the next set of instructions to be executed will typically be either the instructions immediately following the conditional jump instruction in sequence, which is currently stored in the instruction cache, or a set of instructions at a different address, which may not be stored in the cache. If the next instruction to be executed is not located at an address within the instruction cache, the processor will be effectively paused (e.g., by executing "NOP" instructions) for a number of clock cycles while the necessary instructions are loaded into the instruction cache.

Accordingly, when a conditional branch or jump is made, the processor is likely to have to wait a number of clock cycles while a new set of instructions are retrieved. This branch instruction delay is also known as a "branch penalty." A branch penalty may be shorter when branching to an instruction already within the cache and longer when the instruction must be loaded into the cache.

As an illustrative example of a branch penalty, consider the following set of processor instructions

| Code: | Inst A0 |
| | Branch COND, L1 |
| | Inst B0 |
| L1: | Inst C0 |
| | Inst C1 |

In this sample set of processor instructions, program execution will jump from the "Branch COND, L1" instruction to the "Inst C0" instruction at label L1 if COND is TRUE, or non-zero. Otherwise, program execution will proceed to the "Inst B0" instruction first. If the instructions at the L1 label are not in the processor's instruction buffer at the time the "Branch COND, L1" instruction is executed, the processor will have to read the instructions into the buffer, during which time no program instructions are executed. The processor clock cycles wasted by a processor awaiting instructions to be read into its instruction buffer are a measure of the branch penalty. To further illustrate a branch penalty using this scenario, consider the above set of processor instructions at execution time when the branch is taken and the instructions at L1 are not present in the processor's instruction buffer:

| Execution: | Cycle |
|---|---|
| Inst A0 | 1 |
| Branch to L1 | 2 |
| NOP: penalty | 3 |
| NOP: penalty | 4 |
| ... | |
| NOP: penalty | 16 |
| NOP: penalty | 17 |
| Inst C0 | 18 |
| Inst C1 | 19 |

For simplicity, this example assumes a single clock cycle per instruction, branch or NOP. Also, the number of clock cycles needed to provide the instruction "Inst C0" is only for exemplary purposes, i.e., the "Inst C0" instruction may be available to the processor before or after clock cycle 18. In the above example, although the "Branch to L1" instruction was executed at clock cycle 2, the instruction "Inst C0" at L1 was not available to the processor in its instruction buffer until clock cycle 18. The branch penalty in this example is thus 16 clock cycles.

Several methods have been developed to minimize or eliminate the branch penalty. These methods include both hardware and software approaches. Hardware methods have included the development of processor instruction pipeline architectures that attempt to predict whether an upcoming branch in an instruction set will be taken, and pre-fetch or pre-load the necessary instructions into the processor's instruction buffer. In theory, pipelined processors can execute one instruction per machine clock cycle when a well-ordered, sequential instruction stream is executed. This may be accomplished even though each instruction itself may implicate or require a number of separate micro-instructions to be effectuated.

In one pipeline architecture approach, a fixed algorithm is employed to predict if an instruction branch will be taken. This approach has a drawback in that the fixed algorithm is not changeable, and thus cannot be optimized for each program executed on the processor.

Another hardware approach uses a branch history table ("BHT") to predict when a branch may be taken. A BHT may be in the form of a table of bitmaps wherein each entry corresponds to a branch instruction for the executing program, and each bit represents a single branch or no-branch decision. Some BHT's provide only a single bit for each branch instruction, thus the prediction for each occurrence of the branch instruction corresponds to whatever happened last time. This is also known as 1-bit dynamic prediction. Using 1-bit prediction, if a conditional branch is taken, it is predicted to be taken the next time. Otherwise, if the conditional branch is not taken, it is predicted to not be taken the next time.

A BHT is also used to perform 2-bit dynamic prediction. In 2-bit dynamic prediction, if a given conditional branch is taken twice in succession, it is predicted to be taken next time. Likewise, if the branch is not taken twice in succession, it is predicted to not be taken the next time. If the branch is both taken once and not taken once in the prior two instances, then the prediction for the next instance is the same as the last time. Generally, if the branch is used for loop or exception handling, 2-bit dynamic prediction using a BHT is better than 1-bit because the branch is taken only once per loop or execution. Two-bit prediction tends to be more accurate and have a greater hardware cost. Therefore, if the state does not change frequently, 1-bit prediction may be sufficient for many purposes.

A BHT uses a significant amount of processor hardware resources, and may also result in significant branch penalties.

In a software approach, an instruction is provided that causes a pre-fetch of instructions starting at a specified address. In one implementation, this software takes the form of a HINT(ADDRESS) instruction, wherein the processor automatically pre-fetches the instructions beginning at ADDRESS as soon as the HINT is encountered. By placing the HINT several instructions before the actual branching instruction, the programmer can reduce the number of clock cycles during which the processor is awaiting the fetch of the next instruction.

One drawback to the use of the HINT(ADDRESS) instruction is that it unconditionally causes the pre-fetching of instructions. Thus, whether or not the branch is taken, the instructions at the branch address will be pre-fetched. The programmer must therefore decide where to place the HINT (ADDRESS) instruction, and the programmer may not always make the best predictions as to when the branch will be taken. If the programmer is incorrect, i.e., if the HINT (ADDRESS) instruction is given and the branch is not taken, the pre-fetch is a wasted effort. A significant time penalty is thus incurred from having to squash the erroneous instruction, flush the pipeline and re-load the correct instruction sequence. Depending on the size of the pipeline, this penalty can be quite large.

The hardware and software approaches to minimizing or eliminating branch penalties also do not account for the fact that the probability of conditions for branching varies throughout the execution of a program.

SUMMARY OF THE INVENTION

The present invention addresses these drawbacks.

In one aspect, the present invention provides a method that includes specifying a value in a first portion of a conditional pre-fetch instruction associated with a branch instruction used for effectuating a branch operation in a processor. Next a target instruction address is specified in a second portion in the conditional pre-fetch instruction. The value is then evaluated to determine whether a condition is met. If the condition is met, one or more instructions are pre-fetched starting at the target instruction address into an instruction buffer of the processor.

In another aspect, the target instructions are pre-fetched as described above when the value is non-zero.

A method of operating a processor having an instruction cache and using a branch control instruction associated with a conditional pre-fetch instruction. The conditional pre-fetch instruction includes a test condition portion and an instruction address portion. The method includes the steps of: (a) determining if the test condition portion of the conditional pre-fetch instruction evaluates to a TRUE value; and (b) when the test condition portion of the conditional pre-fetch instruction evaluates to a TRUE value, preloading one or more instructions beginning at an address indicated by the instruction address portion of the conditional pre-fetch instruction into an instruction buffer of the processor.

A non-transitory computer readable storage medium is also provided in an aspect of the present invention. The non-transitory computer readable storage medium contains a program including a conditional pre-fetch instruction operable to cause a processor to perform several steps. a value is specified in a first portion of the conditional pre-fetch instruction. The conditional pre-fetch instruction is associated with a branch instruction used for effectuating a branch operation in the processor. A target instruction address is specified in a second portion in the conditional pre-fetch instruction. The value is used to determine whether a condition is met. If the condition is met, one or more instructions starting at the target instruction address are pre-fetched into an instruction buffer of the processor.

A processor under control of a program including a conditional pre-fetch instruction in conjunction with a branch instruction is also provided. The program causes the processor to decode a first portion of the conditional pre-fetch instruction, which specifies a value for evaluation. the value evaluates to a true or false. Next, if the value evaluates to true, a second portion of the conditional pre-fetch instruction is decoded. This second portion identifies an address of a particular target instruction, which is then pre-fetched. The pre-fetching operation is associated with an operation to move the particular target instruction from a cache to an instruction buffer of the processor.

BRIEF DESCRIPTION OF THE DRAWINGS

FIG. 3 is a flow chart of a method in accordance with an embodiment of the present invention.

DETAILED DESCRIPTION OF THE PREFERRED EMBODIMENTS

Figure 1:
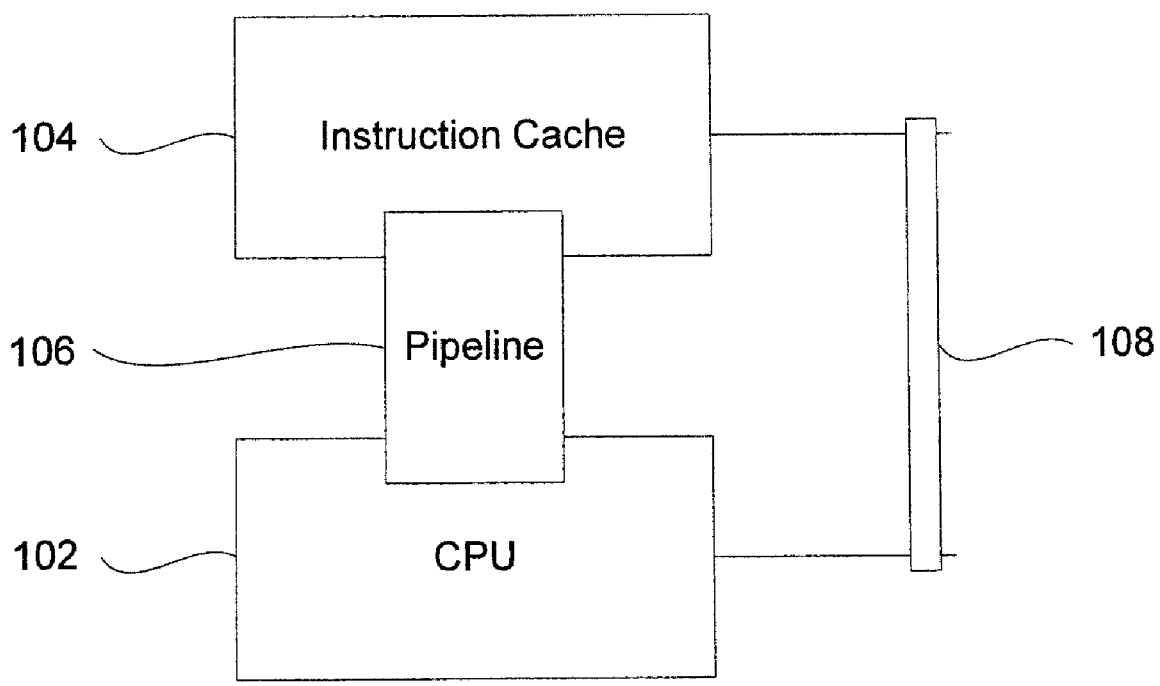
FIG. 1 is a schematic block diagram of a system in accordance with an embodiment of the present invention.

As shown in FIG. 1, a computer system 100 in accordance with one embodiment of the invention comprises a central processing unit ("CPU") 102, an instruction cache 104, a pipeline 106 connecting the CPU 102 to the instruction cache 104, and a data bus 108. Although only these components are depicted in FIG. 1, it should be appreciated that a typical system 100 can include a large number of components, peripherals, and communications buses. In a preferred embodiment, the computer system 100 is a general purpose computer having all the additional internal components normally found in a personal computer such as, for example, a display, a CD-ROM, a hard-drive, a mouse, a keyboard, speakers, a microphone, a modem and all of the components used for connecting these elements to one another. These components have not been depicted in FIG. 1 for clarity. Additionally, the computer system 100 may comprise any workstation, PDA, or other processor-controlled device or system capable of processing instructions.

The CPU 102 may be a processor of any type. The CPU 102 might also be a multiprocessor system. In a multiprocessor system, a more complex instruction cache 104 and pipeline 106 may be used than those depicted here, although the present invention is similarly applicable to such systems.

The instruction cache 104 may also be of any sort. For example, the instruction cache 104 can be a 32 kiloword (KW) instruction cache using four word blocks. Alternatively, any size instruction cache 104 using any size blocks may also be used. The terms "instruction cache" and "instruction buffer" are used herein interchangeably, with no distinction intended between the use of either term.

As depicted in FIG. 1, the instruction cache 104 and CPU 102 are interconnected by an instruction pipeline 106. In an embodiment of the invention, this pipeline represents the hardware and/or firmware used by the system 100 to manage and move instructions between the instruction cache 104 and the CPU 102. For example, many CPUs have specialized circuitry to manage their associated instruction pipelines and buffers.

In a preferred embodiment, the instruction cache 104 and pipeline 106 are packaged with the CPU 102 in a single integrated circuit (not depicted). Such packaging advantageously provides close proximity of the instruction cache 104, pipeline 106 and CPU 102, which minimizes power consumption and instruction transfer time.

In an embodiment of the invention, the instruction cache 104 and CPU 102 may each be in communication with a data bus 108, thereby allowing the transfer of instructions and data from other devices and memory (not depicted).

Figure 2:
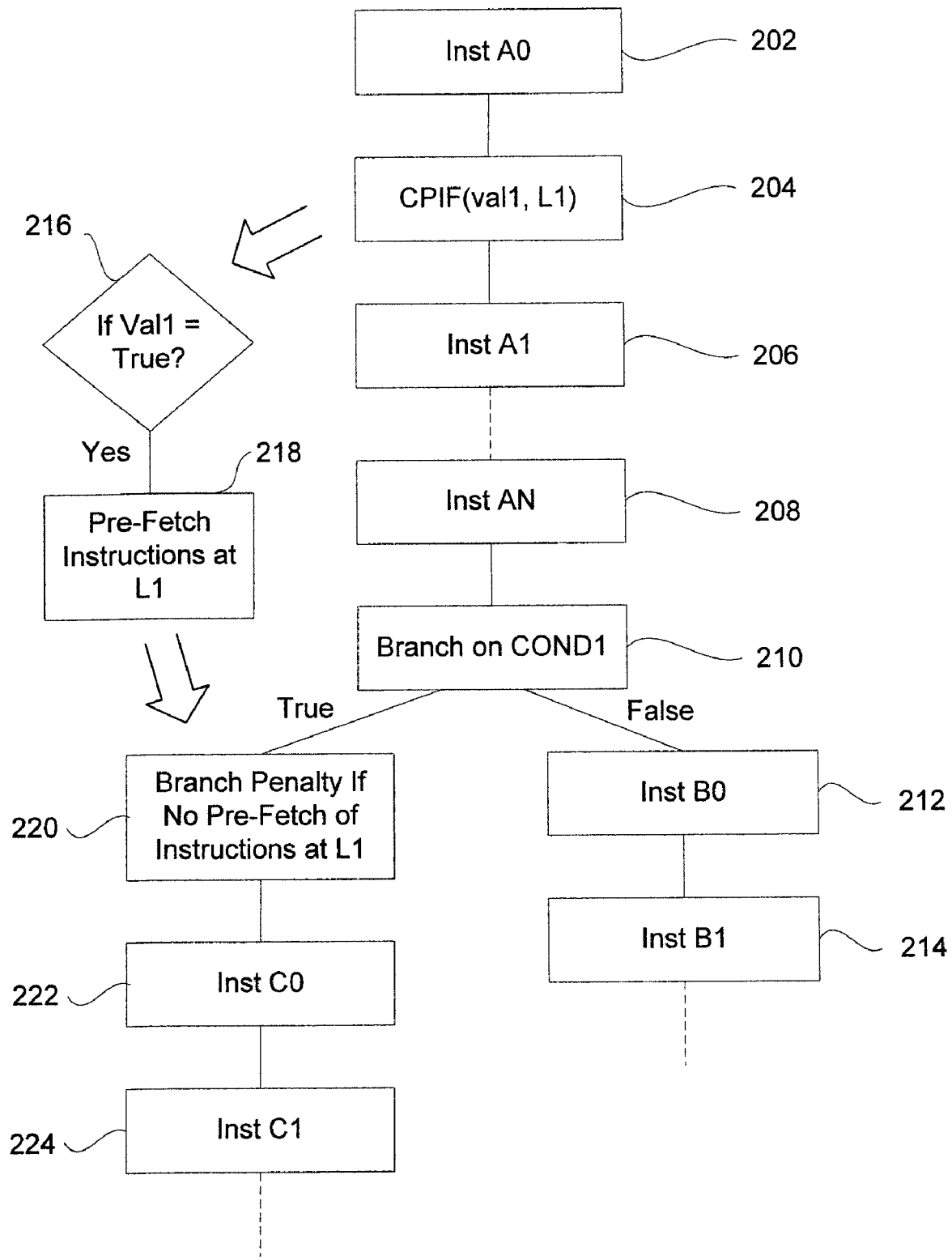
FIG. 2 is an exemplary flowchart of a method in accordance with an embodiment of the present invention.

FIG. 2 is an exemplary flowchart 200 of a method in accordance with an embodiment of the present invention. Preferably, the CPU executes instructions sequentially. Thus, in FIG. 2, "Inst A0" 202 is first executed. Then the CPU executes the "CPIF(vall, L1)" 204 instruction. The CPIF instruction of this example is the conditional instruction pre-fetch. In the present example, a programmer has placed the CPIF instruction several instructions before the "Branch on COND1" instruction 210. This placement allows time for the instructions at the branch-to address to be pre-fetched, if necessary, prior to the CPU executing the "Branch on COND1" instruction 210.

In an embodiment, the "CPIF(vall, L1)" instruction 204 causes the CPU or hardware instruction pipeline circuitry to evaluate the "vall" component of the "CPIF(vall, L1)" instruction 204. In a preferred embodiment, if the "vall" component evaluates as a non-zero value, i.e., vall is 'TRUE' at action 216, then the CPU or hardware instruction pipeline circuitry begins the pre-fetch of instructions located at the address given by the "L1" component 218.

The CPU, meanwhile, may continue to execute the "Inst A1" instruction 206, as well as any others in sequence. At some point, as depicted here by "Inst AN" 208, the instruction immediately preceding the "Branch on COND1" instruction 210 is executed. In a preferred embodiment, the pre-fetch of instructions located at the address given by the "L1" component 218 of the "CPIF(vall, L1)" instruction is completed prior to the CPU execution of the "Branch on COND1" instruction 210.

When the CPU executes the "Branch on COND1" instruction 210 in an embodiment of the present invention, either the condition given by "COND1" is 'TRUE' or it is 'FALSE'. Preferably, if COND1 is 'FALSE', the branch is not taken, and the CPU continues program execution with the next sequential instructions, "Inst B0" 212, then "Inst B1" 214, and so on. Otherwise, if COND1 is 'TRUE', the branch is taken, and the CPU preferably continues execution with "Inst C0" 222, then "Inst C1" 224, and so forth. If the pre-fetch of instructions located at the address given by the "L1" component 218, namely the "Inst C0" 222, "Inst C1" 224, etc. instructions is not completed when the CPU executes the "Branch on COND1" instruction 210, then a branch penalty 220 occurs while the pre-fetch completes.

A greater branch penalty is encountered if the "CPIF(vall, L1)" instruction 204 causes the incorrect prediction that the branch will or will not be taken. For example, if the "CPIF (vall, L1)" instruction 204 causes the prediction that the branch will be taken and it is not taken, then the instruction cache may not have the "Inst B0" 212 and "Inst B1" 214 instructions when they are needed, likely resulting in the need to flush and re-fill the instruction cache. This is known as an instruction cache "miss". Similarly, if the "CPIF(vall, L1)" instruction 204 causes the prediction that the branch will not be taken and it is taken, then the instruction cache may not have the "Inst C0" 222 and "Inst C1" 224 instructions when they are needed, also likely resulting in the need to flush and re-fill the instruction cache.

The present invention advantageously minimizes the number of instruction cache misses by allowing dynamic prediction of whether a given branch will be taken. In an embodiment of the present invention, this dynamic prediction is enabled by providing for testing a logical condition embedded within the CPIF instruction. By proper selection of the condition to test, a programmer can greatly increase the accuracy of the branching predictions.

In the example shown in FIG. 2, a relatively simple parameter of the CPIF instruction, 'vall', is evaluated to determine if it is non-zero (TRUE) or a zero (FALSE), corresponding to 'pre-fetch' and 'do not pre-fetch'. Likewise, the preferably more complex condition 'COND1' of the "Branch on COND1" instruction 210 is evaluated to determine if the branch is taken. By selecting a 'vall' whose TRUE or FALSE status closely corresponds with the 'COND1' of the "Branch on COND1" instruction, the programmer may improve the branching predictions. Indeed, in an embodiment of the present invention, 'vall' may be identical to 'COND1'.

FIG. 3 presents a more detailed flowchart 300 of a simplified processor executing a conditional pre-fetch instruction in accordance with an embodiment of the present invention. In a general operation, a processor decodes the instruction addressed by its instruction pointer 302. The processor determines if the decoded instruction is a conditional pre-fetch instruction 304. If it is not a conditional pre-fetch, the processor proceeds with instruction processing 306. When the instruction processing is completed, the processor's instruction pointer is incremented 308 to point to the next sequential instruction, which is then decoded by the processor 302.

If the instruction is a conditional pre-fetch, the processor evaluates the 'value' component of the conditional pre-fetch instruction 310. In a preferred embodiment, the conditional pre-fetch instruction has the form: CPIF(value, address), wherein the 'CPIF' is the instruction pneumonic, 'value' is the expression to be evaluated, and 'address' is the beginning address of the instructions to be pre-fetched if value is TRUE. Although the pneumonic 'CPIF' is used herein to represent the conditional pre-fetch instruction, any pneumonic may be employed in an embodiment.

The processor then evaluates the 'value' component of the conditional pre-fetch instruction 312. If it is a non-zero value, which is also herein referred to as 'TRUE', the processor then pre-fetches the instructions at the location indicated by the 'address' component of the conditional pre-fetch instruction 314. Any number of instructions may be pre-fetched in a given embodiment of the invention, although the number of instructions pre-fetched is preferably related to the size of the instruction cache and the architecture of the processor's pipeline.

If the 'value' component of the conditional pre-fetch instruction is zero, which is referred to herein as 'FALSE', the processor does not perform a pre-fetch operation. Instead, it preferably proceeds to increment its instruction pointer 308 and decode the next sequential instruction 302.

The flowchart of FIG. 3 is simplified for exemplary purposes. For example, as is well known in the art, many processors are of the multiprocessing variety, wherein several instructions are in various stages of execution by the processor at any given time. An embodiment of the present invention also envisions the use of such multiprocessing processors. These embodiments generally use more complex instruction pipeline architectures that allow for several instruction to be in various stages of execution at each processor clock cycle.

Additionally, in one embodiment the processor itself manages the instruction pipeline and the instruction cache.

In another embodiment of the present invention, the instruction pipeline and instruction cache may be managed by hardware associated with the processor but not actually considered part of the processor. As mentioned above, it is possible that one processor may manage these components for another processor.

As an illustrative example of an embodiment of the invention, consider the following set of processor instructions

|  | Code: | Inst A0 |
|---|---|---|
|  |  | CPIF VAL, L1 |
|  |  | Inst A1 |
|  |  | Inst A2 |
|  |  | Inst A3 |
|  |  | Branch COND, L1 |
|  |  | Inst B0 |
|  | L1: | Inst C0 |
|  |  | Inst C1 |

In this exemplary set of processor instructions, program execution will jump from the "Branch COND, L1" instruction to the "Inst C0" instruction at label 'L1' if 'COND' is 'TRUE', or non-zero. Otherwise, program execution will proceed to the "Inst B0" instruction first. If the instructions at the 'L1' label are not in the processor's instruction buffer at the time the "Branch COND, L1" instruction is executed, the processor may incur a branch penalty.

To further elaborate on this exemplary use of the conditional pre-fetch instruction, consider the above sample set of processor instructions at execution time, when the branch is taken and the instructions at 'L1' are not present in the processor's instruction buffer. Exemplary clock cycles have been provided for further illustration:

| Execution: | Cycle | Notes |
|---|---|---|
| Inst A0 | 1 |  |
| CPIF VAL, L1 | 2 | Begin pre-fetch |
| Inst A1 | 3 |  |
| Inst A2 | 4 |  |
| Inst A3 | 5 | Pre-fetch completed |
| Branch to L1 | 6 |  |
| Inst C0 | 7 |  |
| Inst C1 | 8 |  |

As indicated, the condition pre-fetch operation may advantageously save a significant number of processor clock cycles when compared with a similar scenario that does not use a conditional pre-fetch, as described above.

In another example of using a conditional pre-fetch instruction in accordance with an embodiment of the present invention, use of the conditional pre-fetch by a "C" language programmer is envisioned. Although this example uses the "C" programming language, any programming language, including but not limited to any assembly language, any compiled language, such as "C", "C++", Cobol, Fortran, Ada, Pascal, etc., or any interpretive language, such as BASIC, JAVA, XML, or any other language may be used.

Using the "C" language loop as an example (in pseudocode):

```
for (i=0; i < n; i++)
{
    instruction ...
} /* conditional branch */
```

A conditional branch is implicit at the closing bracket "}", where the "/* conditional branch */" comment has been placed. Thus, each time 'instruction . . . ' is executed, the variable i is incremented and compared with n. If i is less than n, then the loop repeats. This is often implemented in compiled machine language as a conditional branch operation.

Using an embodiment of the present invention, the programmer may rewrite this "C" language loop thus:

```
L1:     for (i=0; i < n; i++)
        {
            CPIF (( i != n−1), L1);
            instruction ...
        } /* conditional branch */
```

This version of the "C" language adds an address label 'L1' at the top of the 'for' loop, and a conditional pre-fetch instruction 'CPIF' at the outset of the loop. Note that the value to be evaluated for the conditional pre-fetch instruction is (i !=n−1). This expression evaluates to a non-zero value until the last iteration of the loop. Therefore, the instructions at address L1 will be pre-fetched for each loop iteration except for the last loop iteration. In this manner, the loop may be advantageously processed and executed without the processor incurring any branch penalty.

In an embodiment of the invention, a 1-bit or 2-bit branch history is used together with a CPIF instruction to minimize branch penalties. For example, the branch history may be stored in one or two processor registers. Prior to the next conditional branch, a CPIF instruction may use the stored register values in its expression to be evaluated. A conventional branch history table only uses past history to determine when to pre-fetch instructions. One aspect of the invention, however, uses information contained in the branch history table as only one of the parameters to make a determination of a higher level. In this manner, the CPIF can incorporate the advantages of using 1-bit or 2-bit branch histories.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

What is claimed is:
1. A method comprising:
 (a) specifying a value in a first portion of a conditional pre-fetch instruction, the conditional pre-fetch instruction being associated with a branch instruction used for effectuating a branch operation in a processor, the value corresponding to a condition of the branch instruction;

(b) specifying a target instruction address in a second portion in the conditional pre-fetch instruction;

(c) evaluating the value to determine whether a condition is met; and (d) pre-fetching one or more instructions starting at the target instruction address into an instruction buffer of the processor when the condition is met;

wherein a 1-bit or 2-bit branch history is used together with the conditional pre-fetch instruction to minimize branch penalties by using information stored in the 1-bit or 2-bit branch history to evaluate the value to determine whether the condition is met.

2. The method according to claim 1, wherein the condition is met when the value is non-zero.

3. The method according to claim 1, wherein the conditional pre-fetch instruction causes the processor to initiate a pre-fetch operation of the target instructions based on the value.

4. The method according to claim 1, further comprising pre-loading the one or more instructions in a hardware pipeline of the processor in response to the conditional pre-fetch instruction.

5. The method of claim 1, wherein a number of instructions pre-fetched is related to the size of an instruction cache and architecture of a pipeline of the processor.

6. The method of claim 1, wherein the value is identical to the condition of the branch instruction.

7. A method of operating a processor having an instruction cache and using a branch control instruction associated with a conditional pre-fetch instruction, the conditional pre-fetch instruction including a test condition portion and an instruction address portion, the test condition portion corresponding to a condition of the branch control instruction, the method including:

(a) determining if the test condition portion of the conditional pre-fetch instruction evaluates to a TRUE value; and (b) when the test condition portion of the conditional pre-fetch instruction evaluates to a TRUE value, preloading one or more instructions beginning at an address indicated by the instruction address portion of the conditional pre-fetch instruction into an instruction buffer of the processor;

wherein a 1-bit or 2-bit branch history is used together with the conditional pre-fetch instruction to minimize branch penalties by using information stored in the 1-bit or 2-bit branch history to determine if the test condition portion of conditional pre-fetch instruction evaluates to the TRUE value.

8. The method according to claim 7, wherein evaluation of a non-zero value of the test condition portion determines a TRUE evaluation.

9. The method according to claim 7, further including the step: initiating a pre-fetch operation of the one or more instructions based on the test condition.

10. The method of claim 7, wherein a number of instructions pre-fetched is related to the size of the instruction cache and architecture of a pipeline of the processor.

11. The method of claim 7, wherein the test condition portion is identical to the condition of the branch control instruction.

12. A non-transitory computer-readable storage medium containing a program including a conditional pre-fetch instruction operable to cause a processor to perform steps comprising:

(a) specifying a value in a first portion of the conditional pre-fetch instruction, the conditional pre-fetch instruction being associated with a branch instruction used for effectuating a branch operation in the processor, the value corresponding to a condition of the branch instruction;

(b) specifying a target instruction address in a second portion in the conditional pre-fetch instruction;

(c) evaluating the value to determine whether a condition is met; and (d) pre-fetching one or more instructions starting at the target instruction address into an instruction buffer of the processor when the condition is met;

wherein a 1-bit or 2-bit branch history is used together with the conditional pre-fetch instruction to minimize branch penalties by using information stored in the 1-bit or 2-bit branch history to evaluate the value to determine whether the condition is met.

13. The non-transitory computer-readable storage medium according to claim 12, wherein the conditional pre-fetch instruction causes the processor to initiate a pre-fetch operation of the particular target instruction into an instruction buffer of the processor based on the conditional value.

14. The non-transitory computer-readable storage medium according to claim 12, wherein the first portion of the conditional pre-fetch instruction comprises a processor register-loadable value.

15. The non-transitory computer-readable storage medium according to claim 12, wherein the address specified by the second portion of the conditional pre-fetch instruction comprises an offset of a processor cache.

16. The non-transitory computer-readable storage medium according to claim 12, wherein the conditional pre-fetch instruction is locatable in advance of the associated program branch instruction so that the processor can compute the target address before the program branch instruction is executed.

17. The non-transitory computer-readable storage medium according to claim 12, wherein the conditional pre-fetch instruction permits software control of instruction preloading in a hardware pipeline of the processor.

18. The non-transitory computer-readable storage medium according to claim 12, wherein the first portion of the conditional pre-fetch instruction includes information pertaining to whether branching has occurred in previous iterations of the associated branch instruction.

19. The non-transitory computer-readable storage medium of claim 12, wherein the value is identical to the condition of the branch instruction.

20. A processor under control of a program including a conditional pre-fetch instruction in conjunction with a branch instruction, the program causing the processor to perform steps comprising:

(a) decoding a first portion of the conditional pre-fetch instruction, the first portion specifying a value for evaluation that corresponds to a condition of the branch instruction, the value being evaluated as TRUE or FALSE; and (b) decoding a second portion of the conditional pre-fetch instruction, the second portion identifying an address of a particular target instruction; and (c) pre-fetching the particular target instruction when the value evaluates to TRUE, the pre-fetching operation being associated with an operation to move the particular target instruction from a cache to an instruction buffer of the processor;

wherein a 1-bit or 2-bit branch history is used together with the conditional pre-fetch instruction to minimize branch penalties by using information stored in the 1-bit or 2-bit branch history to evaluate the value of the first portion of the conditional pre-fetch instruction to determine whether the condition of the branch instruction is met.

21. The processor according to claim 20, wherein a pre-fetch operation of the particular target instruction is executable by the processor based on evaluation of the value.

22. The processor according to claim 20, wherein when the value is non-zero the value evaluates to TRUE, and when the value is zero the value evaluates to FALSE.

23. The processor according to claim 20, wherein the conditional pre-fetch instruction permits software control of instruction pre-loading in a hardware pipeline of the processor.

24. The processor according to claim 20, wherein the value for evaluation of the first portion of the conditional pre-fetch instruction includes information indicating whether branching occurred during previous iterations of the branch instruction.

25. The processor of claim 20, wherein a number of instructions pre-fetched is related to the size of the cache and architecture of a hardware pipeline of the processor.

26. The processor of claim 20, wherein the value is identical to the condition of the branch instruction.

* * * * *

UNITED STATES PATENT AND TRADEMARK OFFICE
CERTIFICATE OF CORRECTION

| | |
|---|---|
| PATENT NO. | : 8,250,344 B2 |
| APPLICATION NO. | : 12/540522 |
| DATED | : August 21, 2012 |
| INVENTOR(S) | : Masahiro Yasue and Akiyuki Hatakeyama |

It is certified that error appears in the above-identified patent and that said Letters Patent is hereby corrected as shown below:

On the Title Page
Item (57) Abstract, Line 2, "to for" should read -- for --.
Item (57) Abstract, Line 9, "is provided" should read -- are provided --.

In the Specifications
Col. 2, Line 56, "BHT's" should read -- BHTs --.
Col. 3, Line 58, "instruction." should read -- instruction is provided. --.
Col. 4, Line 19, "evaluation. the" should read -- evaluation. The --.
Col. 7, Line 6, "several instruction" should read -- several instructions --.

In the Claims
Claim 5, Col. 9, Line 24, "is related" should read -- are related --.
Claim 10, Col. 9, Line 57, "is related" should read -- are related --.
Claim 25, Col. 12, Line 7, "is related" should read -- are related --.

Signed and Sealed this
Seventh Day of January, 2014

Margaret A. Focarino
*Commissioner for Patents of the United States Patent and Trademark Office*